United States Patent [19]

Sawyer et al.

[11] Patent Number: 5,307,400
[45] Date of Patent: Apr. 26, 1994

[54] CALL ROUTING IN MOBILE TELEPHONE SYSTEMS

[75] Inventors: Francois Sawyer, Hubert, Canada; Christer Palmgren, Karkskrona, Sweden

[73] Assignee: Telefonaktiebolaget L M. Ericsson, Stockholm, Sweden

[21] Appl. No.: 797,548

[22] Filed: Nov. 25, 1991

[51] Int. Cl.$^5$ .................................. H04M 11/00
[52] U.S. Cl. .................................. 379/59; 379/60
[58] Field of Search .............. 379/56, 57, 58, 59, 379/60, 91, 144; 455/31.1, 33.1

[56] References Cited

U.S. PATENT DOCUMENTS

| | | | |
|---|---|---|---|
| 4,737,978 | 4/1988 | Burke et al. | 379/60 |
| 4,775,999 | 10/1988 | Williams | 379/60 |
| 4,833,701 | 5/1989 | Comroe et al. | 379/60 |
| 4,833,702 | 5/1989 | Shitara et al. | 379/60 |
| 4,843,622 | 6/1989 | Yotsutani et al. | 379/59 |
| 4,852,148 | 7/1989 | Shibata et al. | 379/59 |
| 4,856,048 | 8/1989 | Namamoto et al. | 379/60 |
| 4,876,738 | 10/1989 | Selby | 455/33 |
| 4,879,740 | 11/1989 | Nagashima et al. | 379/61 |
| 4,901,340 | 2/1990 | Parker et al. | 379/60 |
| 4,972,355 | 11/1990 | Mullins | 379/59 |
| 4,972,460 | 11/1990 | Sasuta | 379/60 |
| 4,977,589 | 12/1990 | Johnson et al. | 379/58 |
| 5,142,654 | 8/1992 | Sanberg et al. | 379/59 |

FOREIGN PATENT DOCUMENTS

WO91/13522 2/1991 PCT Int'l Appl. .
2254521A 10/1992 United Kingdom .

OTHER PUBLICATIONS

Ballard, Issenmann, Sanchez, "Cellular Mobile Radio as an Intelligent Network Applications", Electrical Communication 1989.

Primary Examiner—Curtis Kuntz
Assistant Examiner—William D. Cumming
Attorney, Agent, or Firm—Johnson & Gibbs

[57] ABSTRACT

A continuous and accurate location system for a mobile telephone subscriber which utilizes a temporary location indication as well as a registration location. If a visiting mobile subscriber sends a registration access, the visited system acknowledges the registration, records the mobile subscriber's presence and signals the mobile subscriber's home system of the mobile's presence. Receipt of the mobile's location from the visited system causes the mobile subscriber's home system to update its registration location data for that particular mobile. If a visiting mobile subscriber initiates a call access from within the visited system without registering within the visited system, the visited system allocates a record for the mobile indicating within the record that it has not received a registration from the mobile and transmits to the home system a temporary location signal. The home system stores the temporary location indication, without deleting the existing registration location data for the mobile subscriber and deletes the indication upon the conclusion of the mobile subscriber's call from within the visited system. The temporary location indication is used by the home system to effectuate the routing of calls for the mobile.

20 Claims, 4 Drawing Sheets

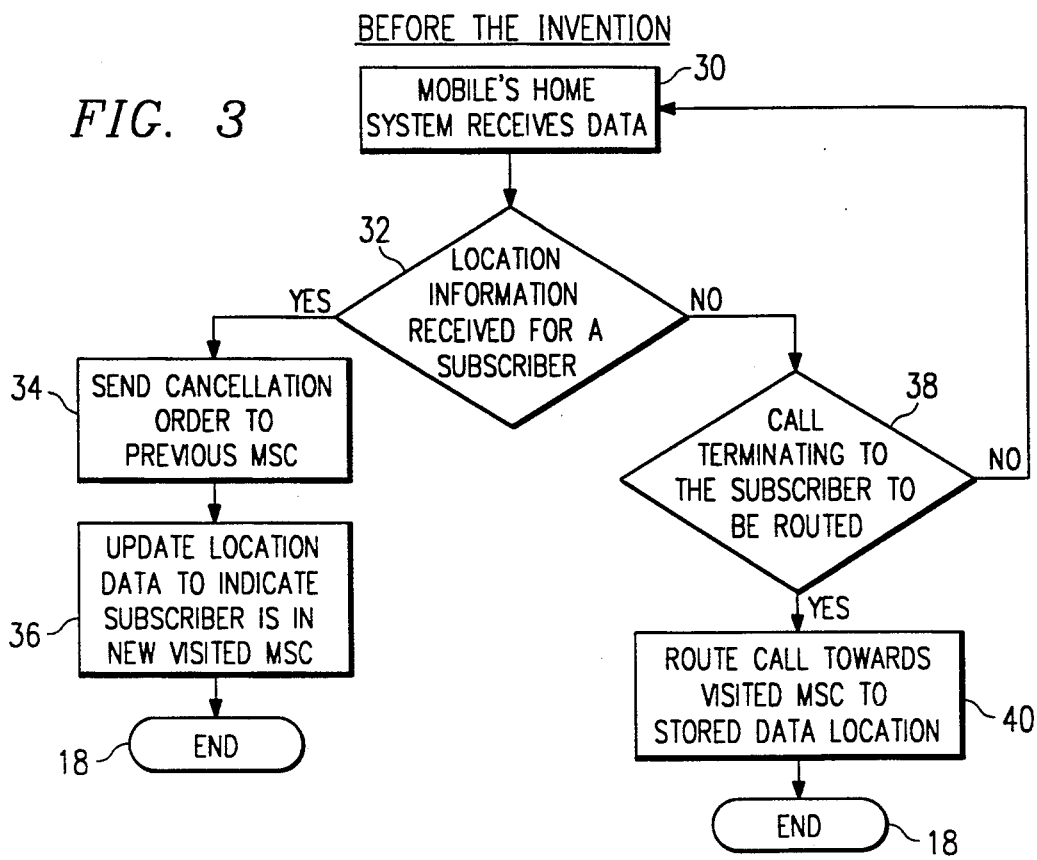
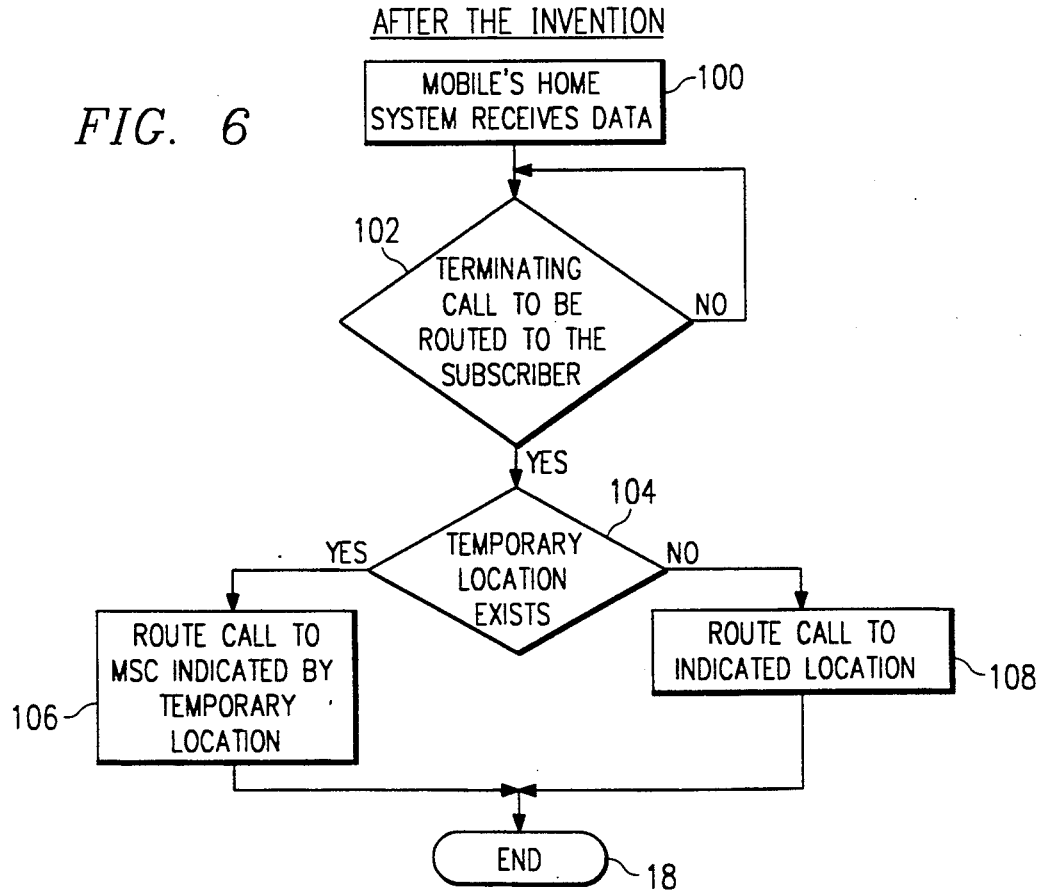

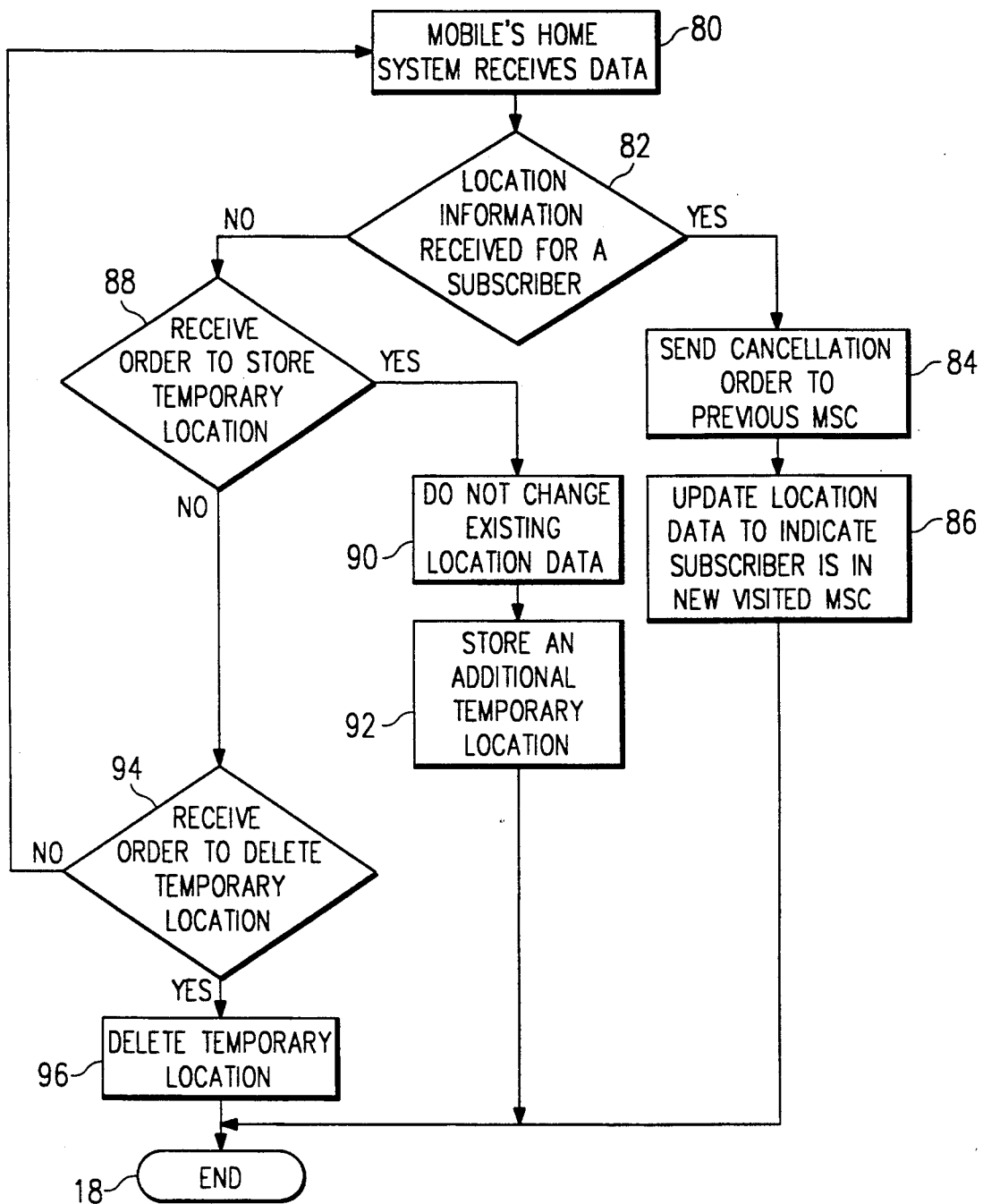

CALL ROUTING IN MOBILE TELEPHONE SYSTEMS

BACKGROUND OF THE INVENTION

1. Field of the Invention

The invention relates to the location of mobile telephone subscribers within a system and, more particularly, to a system for storing the temporary location of a mobile telephone subscriber for use in routing calls to that subscriber.

2. Description of Related Art

Radio telephone service, which has been in use for some time, originally comprised a central site capable of transmitting to a limited number of mobile or portable telephones in a large geographic area via high-powered transmitters. For clarity and convenience, the terms "mobile phone" and "mobile subscribers" will henceforth be used in this document to mean mobile or portable radio telephone stations. Because mobile phone subscriber stations employed low power transmitters, mobile phone transmissions were generally received in prior art systems by a network of satellite receivers located remotely from the central site. The satellite receivers functioned to receive and relay mobile phone transmissions to the central site for processing. In prior art systems only a limited number of radio channels were available, thus limiting the number of radio telephone conversations in an entire city to the specific number of then available channels.

In contrast, modern cellular radio telephone systems provide mobile subscribers with a comparatively large number of radio channels. These channels are effectively increased by reuse of the same radio channels within geographically separated regions within a metropolitan area. By dividing the radio coverage area of the entire cellular system into smaller coverage areas called cells and by using low power transmitters and coverage restricted receivers the call carrying capacity of the system is dramatically increased. Cellular systems of this general type are further described in U.S. Pat. Nos. 3,906,166 and 4,268,722. The limited coverage area within a cell enables the radio channels used in one cell to be reused in another cell which is geographically separated from it according to a predetermined plan, such as the exemplary four-cell pattern shown and described in U.S. Pat. No. 4,128,740. In this four-cell pattern, each cell is assigned a subset of the available radio channels and reuse of the same radio channels is repeated among groups of cells in a specific pattern throughout a metropolitan area.

A cellular system typically utilizes a pair of radio frequencies for each radio channel in each cell. Each cell is assigned at least one paging/access channel and several voice channels. The paging/access channel is employed to control the operation of the mobile phones by means of data messages transmitted to and received from each mobile phone. Functions performed in the control channel include identifying the particular cellular system to the mobile phones, instructing a mobile phone to tune to a voice channel where a conversation may take place, receiving requests for service from a mobile phone, and enabling mobile subscriber registration. The latter function refers to the process by which the mobile phones identify themselves to the system. The data message and radio channel specifications for U.S. cellular radio telephone systems are set forth in Electronic Industries Association (EIA) Standard IS-3D implemented in accordance with 47 C.F.R. 22 and Federal Communications Reports and Orders. Copies of EIA Standard IS-3D may be obtained from the Engineering Department of the Electronic Industries Association at 2001 Eye Street, N.W., Washington, D.C. 20006.

Since each cell of a cellular system may be relatively small in size, the likelihood of a mobile phone travelling out of one cell and into another cell is high. The process of switching an established call from one cell to another is known as a handoff. A cellular system may determine the need for a handoff by periodically measuring the signal strength of each active mobile phone. If the measured signal strength is below a predetermined level, the cellular system determines the availability of other channels in neighboring cells and transmits an instruction to the mobile phone to commanding it to tune to one of such available channels in another cell. Also, as the number of cellular systems increase, handoffs between different cellular systems take place in order to maintain a call in progress as a mobile phone passes from the coverage area of one cellular system to another.

Since a major goal of the mobile telephone system is the interconnection of mobile phones with the extensive public switched telephone network ("PSTN"), it is clear that successful achievement of this goal can only occur when the mobile phone is available to users of the telephone network. Because of the large number of cells in a densely populated area and the continuous movement of mobile phones from one cell to another, there arises the problem of locating a mobile phone as is moves about. If the location of the mobile is not readily accessible it cannot be interconnected with the PSTN.

A known solution to the problem of locating the mobile phone is based on the concept of mobile registration. Mobile registration is the process by which a mobile phone becomes listed as being present in the service area of one of the mobile exchanges in a mobile telephone service network. It should be recognized that one purpose of mobile registration is to permit calls to a mobile phone to be automatically delivered even though the mobile phone may be moving from place to place through a network of cellular systems. It should also be recognized that mobile phone registration according to EIA Standard IS-3D is effected by means of interactions between the cellular system and the mobile phones operating in its service area. One such interaction is called "autonomous registration" and it is controlled by the cellular system through certain information transmitted to the mobile phones. This information is in the form of an overhead message train (OMT), which is transmitted on paging channels throughout a cellular system service area, normally once each second approximately. The OMT includes a system parameter overhead message including station and registration related messages, and optionally, several other messages of which the registration identification message and the registration increment message relate to the autonomous registration process.

Registration may be enabled or disabled individually for each class of mobile phone, e.g., home or roam (explained below), by means of control bits in the system parameter overhead message. The system parameter overhead message also contains the identification number of the serving cellular system from which the mobile phone determines whether it is a "home" or a "roam" mobile phone. Each mobile phone contains, in its internal memory, an entry indicating the identity of its home cellular system and an entry indicating the cellular systems (which may be the home cellular system) in which it has most recently registered successfully. It also stores a value for the cellular system used to determine when it is scheduled to re-register in that cellular system.

In the mobile telephone systems used in North America, the United Kingdom and in other markets, twenty-one frequencies are allocated for the control channels. A two-bit digital color code (DCC) is used to differentiate control channels using the same frequency. It is thus possible to have up to 84 cells, each cell having a control channel with a unique set of frequency and DCC combinations. In densely populated areas, subscriber demand may require more than 84 cells to provide adequate mobile telephone service. In such systems, identical control channels may exist within the coverage area of a single exchange or within the coverage area of several neighboring exchanges.

As indicated, a registration or call access signal is sent over the control channel by the mobile phone and is used to identify the location of the subscriber within the mobile telephone exchange network. This signal enables a visited exchange to update the roaming subscriber's home exchange with the new location of the mobile phone. However, when identical control channels are used, such as in densely populated areas, a mobile's registration access signal may be overheard by other control channels that have identical parameters, resulting in one or more cooperating exchanges registering the subscriber as a visitor. This occurrence is known as a multiple access (usually with double access occurring) and may result in incorrect location data updating within the home exchange for the roaming subscriber. Thus, if two or more base stations linked to different Mobile Telephone Switching Offices ("MTSO"), detect a call access from a mobile phone, all of the MTSOs may each try to update the location in the home system of the mobile phone. The last MTSO to update the home system would overwrite any location data previously stored by other MTSOs, and therefore, create a high potential for the entry of erroneous location data.

A separate problem with the current methods of location updating involves what is known as a "rescan problem." The rescan problem occurs because during idle time (time during which the mobile phone is not involved in a call) the mobile phone continuously listens to the proper forward control channel. Under certain conditions it is necessary for the mobile phone to scan through all of the dedicated forward control channel frequencies ("FOCC") in order to select the signal having the best reception. The FOCC contains several pieces of information including the system identification ("SID"), a location area identification ("LOCAID"), which is defined in the EIA/TIA IS-54 specifications, and an area identification ("AID"), which is defined in the TACS, or United Kingdom, specifications. When the mobile phone detects a change in the SID, LOCAID or AID, it will send an autonomous registration access to inform the network of its location.

The problem arises when the mobile phone initiates a call, and during the call initiation it is required by the air interface to rescan and choose the best possible control channel for sending the call access, without verifying the SID, LOCAID or AID. After the call access, the mobile phone will again rescan for, and choose, a control channel. During these rescans, the mobile may be idle in MTSO A, initiate the call in MTSO B, and then return to MTSO A after the call release. All these events would occur without the mobile phone having detected a change in the system it was accessing. As a result, in this example the mobile phone does not reregister in the system of the control channel it is now tuned after the call release to update its location because it does not know it has reached a new system. The network, however, would update the mobile phone's location to MTSO B upon call initiation and thus, the mobile phone's location would incorrectly be stored as MTSO B in the home system after call release. When a call comes in for the mobile it will be sought in MTSO B, its last registered location, and be essentially lost to the system when it is not found there.

Such incorrect data within a system, as arises with the multiple access problem and the rescan problem, inefficiently uses system assets and can lead to such problems as failure of calls directed to a mobile phone. Thus, the unsatisfactorily addressed existence of multiple access and rescan problem is a shortcoming and deficiency of heretofore designed and implemented mobile communications systems.

Although no prior art solutions to the aforementioned multiple access problem are known, a number of patents contain teachings that bear some relation to the matters discussed herein. These patents are U.S. Pat. Nos. 4,833,702, 4,737,978, 4,876,738, 4,901,304 and 4,843,622. Each of these patents is discussed briefly immediately below.

U.S. Pat. No. 4,833,702 to Shitara et al. discloses a mobile telephone system having a central controller and a cordless telephone located in a local service area. The central controller transmits a periodic pre-registration polling signal to all cordless telephones which can receive it and registers the telephones from which a response signal is returned. After a cordless telephone is registered, a post-registration signal is transmitted by the telephone at periodic intervals. The central controller cancels the telephone registration if the post-registration signal is not detected for a prescribed time period.

U.S. Pat. No. 4,737,978 to Burke, et al. shows a network of cellular phone systems for use by mobile telephone units where registration for cellular system access occurs only in response to a registration ID message included in the overhead message train periodically issued by the cellular phone systems. The mobiles are paged throughout the networked coverage area starting with the coverage area in which the mobile last registered.

U.S. Pat. No. 4,876,738 to Selby shows a mobile phone which may be simultaneously registered in different service areas. The original registration in one service area may continue to be present but in an invalidated form. Thus, rather than presenting an accurate location entry, the system in Selby creates a "customized" enlarged registration area. This reduces the transmission overhead generated by the registration procedure.

U.S. Pat. No. 4,843,622 to Yotsutani et al. relates to a communication control system including a searching arrangement. Yotsutani et al.'s system uses a page sent on a control channel to locate a mobile subscriber. This system controls several cells and sends a page to a plurality of cells in a given area when it has a call to place.

Upon receiving a response from a mobile in a given cell, addressing is begun to the mobile in that cell.

U.S. Pat. No. 4,901,340 to Parker, et al. shows a telephone system which allows a roaming mobile unit to direct the system to forward calls placed to the roamer's home service area to a foreign mobile telephone switching office in which the roamer is currently present. While Parker provides a Temporary Directory Number ("TDN") when in a "remote area," the TDN is for call receipt rather than location tracking purposes.

Review of each of the foregoing patents reveals no disclosure or suggestion of a solution such as that taught herein to the multiple call access problem or to the problem of rescan before and after call access.

SUMMARY OF THE INVENTION

In one embodiment of the present invention, there is a method for monitoring the location of a mobile radio telephone while the mobile phone travels among visited cellular networks. The method includes the first step of storing the location of the mobile phone within the mobile phone's home cellular network. Further, the location of the mobile phone within the mobile phone's home cellular network is updated only upon the mobile phone's registration access within a visited cellular network. A temporary location for the mobile phone is indicated, without deleting the registered location, when the mobile phone initiates a call from within a visited cellular system in which the mobile phone has not registered. The indication of the temporary location is deleted when the mobile phone ends the call from within the visited cellular system.

In one aspect of this embodiment, the indication of a temporary location for the mobile phone involves the visited cellular network receiving a call access from a mobile phone when the mobile phone failed to register within the visited cellular network. The visited cellular network allocates a record to the mobile phone and marks that a registration was not received from the mobile phone. Next, the visited cellular network orders the mobile phone's home cellular system to store a temporary location for the mobile phone, which temporary location corresponds to the visited cellular network. When the home cellular network receives an order to store a temporary location for the mobile phone it preserves the existing location data for the mobile phone and stores the temporary location for the mobile phone.

In another aspect of this embodiment, the indication of a temporary location for the mobile phone could optionally occur upon the mobile phone's successful connection to a voice channel or when the mobile phone successfully connects to a digital traffic channel.

In yet another aspect of this embodiment, deletion of the indication of the temporary location occurs when the visited cellular network receives a call release signal from the mobile phone. Upon receipt of the call release signal, the visited cellular network orders the home cellular system of the mobile phone to delete the indicated temporary location. The home cellular network receives the order to delete the mobile phone's temporary location and deletes the temporary location.

In still a further aspect of the present embodiment, the home cellular network receives calls to be terminated with the mobile phone. Upon receipt of such calls, the home cellular network determines if a temporary location exists for the mobile phone. If a temporary location does exist, the home cellular network routes the received call to the temporary location. Otherwise, the home cellular network directs the received call to the mobile phone's registered location.

In another embodiment, the present invention comprises a mobile communications system for accurately storing the location of a mobile radio telephone. The system includes at least one mobile radio telephone, a home system for the mobile phone, at least one visited system in which the mobile phone can be located, and a means for transmitting a location signal pertaining to the mobile phone's location to the home system. The visited system includes a means for detecting signals transmitted by the mobile radio telephone. Additionally, there is provided a means for distinguishing between registration access and call access signals transmitted by the mobile radio telephone.

In one aspect, the present embodiment also includes a means for allocating a record to a mobile radio telephone in a visited system as well as a means for marking whether a registration access was received from the mobile radio telephone. The system also includes a means for transmitting information to the home system of the mobile radio telephone. The transmission means sends location information to the home system when the radio telephone registers within the visited system. Also, the transmission means orders the home system to store a temporary location for the mobile radiotelephone when the mobile radiotelephone initiates a call access from within the visited system without having registered in this system.

In yet another aspect, the present embodiment further comprises a means for receiving location information pertaining to the mobile radio telephone. Registration location information and temporary location information pertaining to the mobile radio telephone are distinguished from one another and a cancellation order is transmitted to a visited system in whioh the mobile radiotelephone was last registered. Location information of the mobile radio telephone is updated upon receipt of the registration location information. A temporary location is stored without deleting the registration location information. The temporary location may later be deleted. Calls are routed to the mobile radiotelephone's registration location when no temporary location information exists and to the mobile radiotelephone's registration temporary location when such temporary location information does exist.

BRIEF DESCRIPTION OF THE DRAWINGS

The invention may be better understood and its numerous objects, features and advantages become apparent to those skilled in the art by referencing the accompanying drawings in which:

FIG. 3 is a flow diagram outlining the prior art procedure used, prior to the present invention, by the mobile's home system to update the location of a mobile as the mobile travels among visited system;

FIG. 5 is a flow diagram detailing the process employed by the mobile's home system while the mobile travels among different visited systems in accordance with the principles of the present invention; and FIG. 6 is a flow diagram which illustrates call routing while the location storage techniques of the present invention are in use.

DETAILED DESCRIPTION OF A PREFERRED EMBODIMENT

Figure 1:
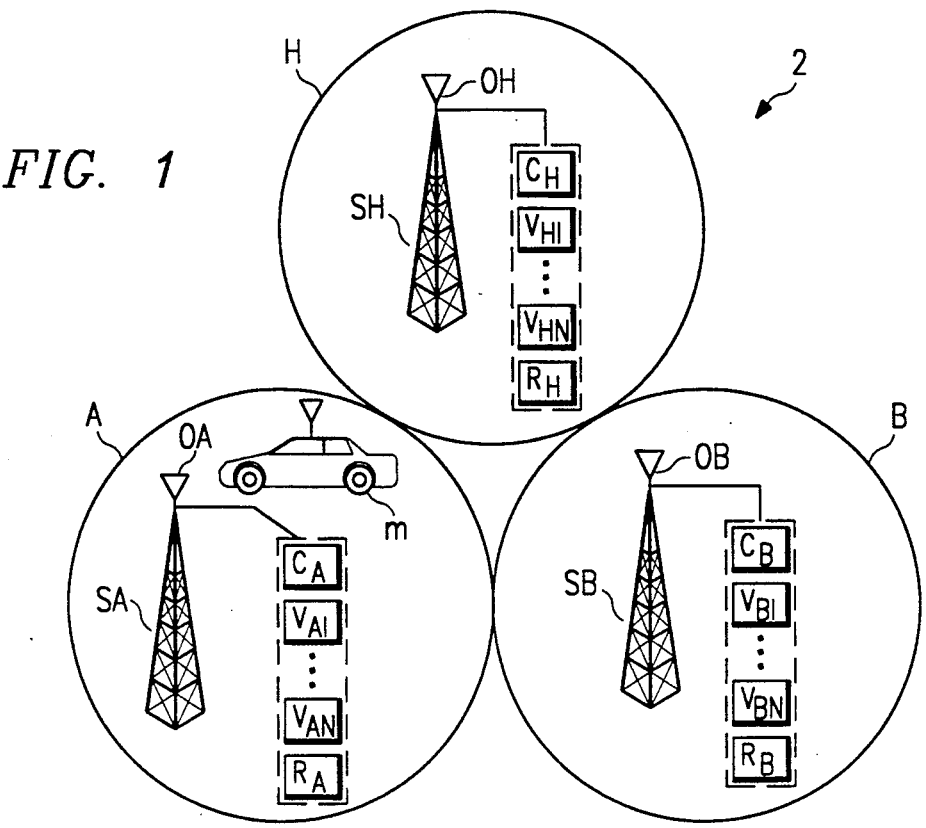
FIG. 1 is a schematic diagram of a simplified three-cell radiotelephone communications system.

FIG. 1 shows three geographically separated cells out of many in a cellular radiotelephone communications network including three exchanges. Network 2 includes cells H, A and B served by fixed stations SH, SA and SB, respectively. Using terms that will be clearly understood based upon further discussions below, cell H is one cell of a "home" exchange and cells A and B are one cell of each of two "visited" exchanges. Fixed stations SH, SA and SB (which are typically located near the geographical center of their respective cells), each include a control channel RF transceiver C, at least one (and typically several) voice channel RF transceivers V, a locating RF receiver R, and an antenna O.

The voice channel transceivers are used to communicate voice signals (e.g., conversations) with mobile transceivers M. The voice channel transceivers V of a fixed station S operate on different radio frequencies (or pairs of frequencies for duplex operation) so that all of those voice channels can be used simultaneously without interfering with one another.

The maximum number of mobile transceivers to which a fixed station can provide service is thus equal to the number of voice channel transceivers the fixed station is provided with. For example, fixed station $S_A$ is equipped with N voice transceivers ($V_{A1}-V_{AN}$), and may therefore simultaneously serve N mobile transceivers M within cell A.

Control channel transceivers C are used to exchange control information with mobile transceivers M. A mobile transceiver M typically requires control information only occasionally (e.g., to initially establish communications between the mobile transceiver and a voice channel transceiver V). Therefore, a single control channel transceiver C is usually sufficient to handle control signal traffic for all mobile transceivers within a cell. For example, during call set-up, cell A control transceiver $C_A$ receives control information from and transmits control information to mobile transceivers M operating within cell A.

Locating receivers R provide signal strength measurements (sometimes called "Received Signal Strength Indicators" or RSSIs) of signals transmitted by mobile transceivers M. Such RSSI measurements are used by cellular network 2 to determine which fixed station S (i.e., which cell) can best serve particular mobile transceivers M. Each locating receiver R is tunable to any voice channel used in network 2 (and is thus operable on frequencies other than those used by voice channel transceivers V associated with the same cell as is the locating receiver). Locating receivers R perform measurements on demand, and therefore, each fixed station S generally requires only a single locating receiver R to perform all RSSI measurements for that cell. For example, locating receiver $R_A$ performs all RSSI measurements for cell A.

As mentioned in the description of related art section above, various registration procedures have been devised to maximize processing capability and to enhance efficiency of cellular radiotelephone communications systems. These procedures are set forth in detail in EIA Standard IS-3D. Generally, the procedures are designed so that a mobile registers often enough so that it does not become "lost" in the system, but not so often that the cellular system becomes burdened with unnecessary registration messages that need to be processed.

It will be recalled from the discussion in the description of related art section above that each mobile has a "home" mobile telephone exchange H although it may "roam" in or "visit" the cells of other mobile telephone exchanges such as A and B in FIG. 1. Data regarding a mobile's current location is maintained in that mobile's home station or exchange, the updating of that data being effected by "visited" exchanges that detect a mobile located therein.

One problem solved by the present invention relates to the simultaneous registration of a mobile in more than one exchange, all but one of the registrations being erroneous. This problem arises because of the limitation within the control channels of only 84 different frequency/DCC combinations. A call access signal sent over a control channel by a mobile in a densely populated area may be overheard by another control channel having identical identification data. Thus, one or more cooperating exchanges can register the subscriber as being located there. This so-called "multiple accessing" results in incorrect location data updated within the home exchange for the roaming subscriber.

A further problem solved, as will be recalled from the discussion in the description of the related art section, relates to the mobile phone moving about in the network 2 during a call without realizing that it had changed locations. When the mobile has rescanned to a control channel after call release it is unaware of its whereabouts and may fail to register itself if it returns to the old location after it releases the call. Thus, the system continues to store obsolete location data for the mobile, thereby creating the "rescan problem."

According to the teachings of the present invention, the aforementioned problems are solved by forcing a system to allow a subscriber to be registered in only one exchange and to provide a temporary location indicator when the mobile wanders from the registered system and initiates a call.

Figure 2:
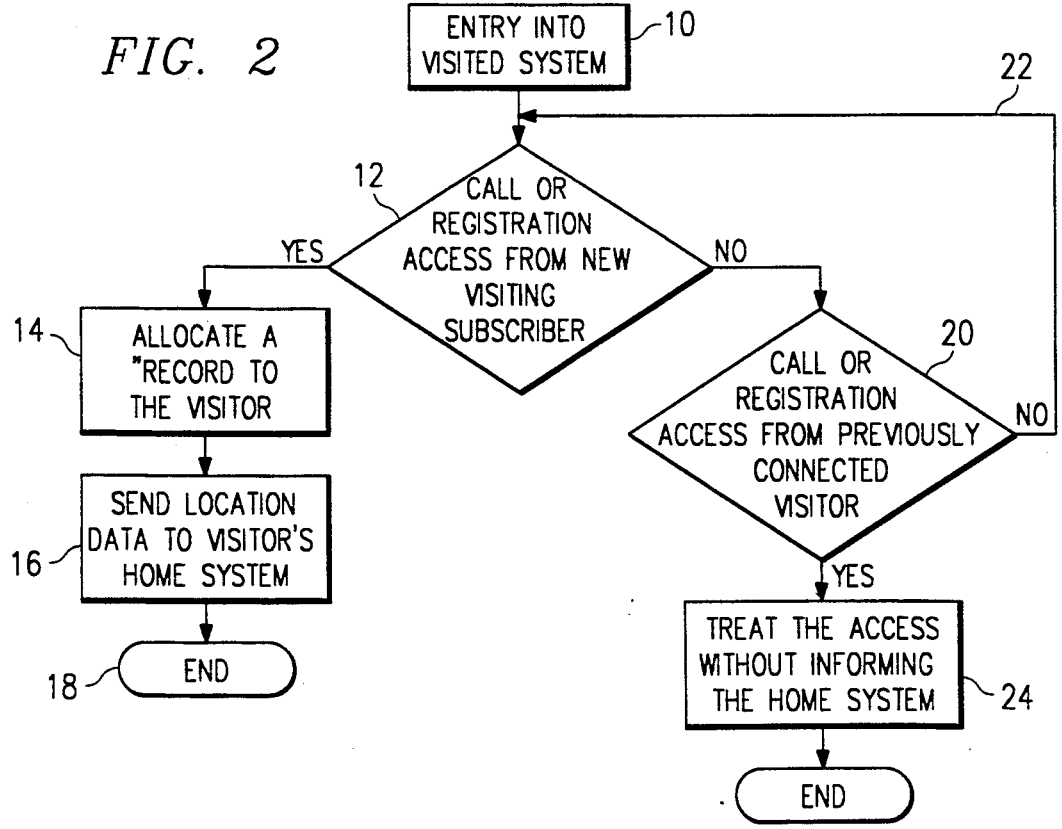
FIG. 2 is a flow diagram outlining the prior art procedure by which location of a mobile in a visited system was recorded prior to the present invention.

Referring now to FIG. 2, there is shown a flow diagram illustrating the process used to record a mobile's location data prior to the present invention. The flow diagram of FIG. 2 describes the process employed when the mobile was outside of its home system, i.e., in a visited system, such as exchanges A or B shown in the Network 2 of FIG. 1. The block 10 indicates the mobile's arrival into the visited system. The visited system would periodically scan or check to determine whether a call or registration access has been initiated by a visiting subscriber, as is shown in block 12. If a call or registration access from a new visiting subscriber is received, the standard process, prior to the present invention, is to proceed to block 14 wherein the visited system allocates a record to the visiting mobile. Once the record of the visiting mobile is stored within the visited system's records, the visited system sends location data to the visiting mobile's home system, as shown in block 16. At this point the mobile phone's location resides within the data banks of both the visited system and the mobile's home system such that call directed to the mobile would be completed. Thus, the process ends at end block 18.

If a call or a registration access from a new visiting subscriber was not received in block 12, the old process is directed to block 20, wherein it is determined if a call or registration access from a previously connected visitor has been received. If no such call or registration access is received, the system revisits block 12 and awaits a call or registration signal from a mobile, as illustrated by flow line 22. If, however, the visited system receives a call or a registration access from a previously connected visitor, the visited system treats the access, does not have informed the visiting mobile's home system of the access, as shown in block 24. The visited system does not inform the mobile's home system because it believes that the home system has already been informed as shown in block 16.

Referring next to FIG. 3, there is shown the process used by a mobile's home system, prior to the present invention, of maintaining location data for a mobile while the mobile visits other systems. Beginning at block 30, it is shown that the mobile's home system receives data regarding a mobile subscriber. The signal received, in this case, equates to the signal send in block 16 of FIG. 2, wherein the visited system notifies the mobile's home system of the mobile's location. Proceeding to block 32, the home system determines whether the location information it received was from one of its mobile subscribers. If the location information it received was from one of its subscribers, the process advances to block 34 wherein the home system sends a cancellation order to the MSC, i.e., the visited system, where the mobile was previously registered. Next, at block 36, the home system updates the mobile's location data to accurately reflect the identity of the new visited system the mobile had registered with. Once the home system records the data indicating where the mobile is located, the process ended, as shown in block 18.

If the data received by the mobile's home system at block 30 is determined not to be location information for one of the system's subscribers, at block 32, then at block 38 the process determines if a call terminating to the mobile subscriber needs to be routed to that subscriber. If the system determines that the signal received was not a call routing signal, the process returns to block 30 to await receipt of another signal. If, on the other hand, the home system determines that a call must be terminated to a subscribing mobile, then at block 40, the home system routes the call to the visited system the identity of which is stored in the home system's location data banks. Once the call is routed, the process ends at block 18.

Figure 4:
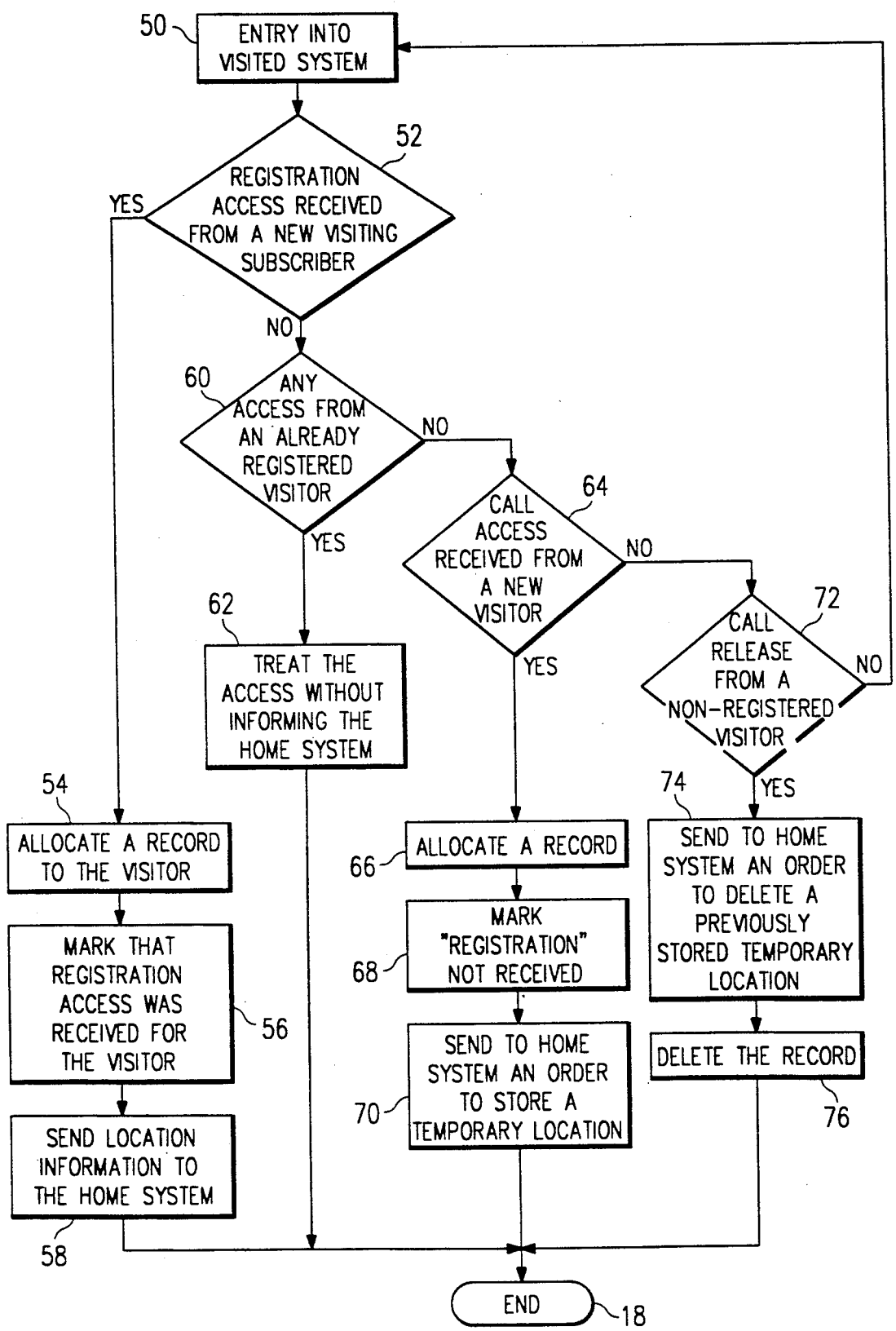
FIG. 4 is a flow diagram detailing the process by which a mobile's location data is stored while the mobile is in a visited system in accordance with the principles of the present invention.

Referring now to FIG. 4, pursuant to the principles of the present invention, there is a flow diagram illustrating the process by which location data of a mobile subscriber is maintained when the mobile is located within a visited system. First, at block 50, the mobile enters a visited system. Upon entry to the visited system, the mobile sends a signal to the visited system, which system will, at block 52, determine whether the signal received comprises a registration access from a new visiting subscriber. If the signal is a registration access from a new visiting mobile, the visited system then allocates a record to the visitor at block 54. The allocation of a record indicates an acknowledgment by the visited system that a visiting mobile phone has entered its region and permits the visited system to transact business with the mobile. Then at block 56, the visited system marks that a registration access was received for the mobile phone. Once the visited system marks the registration access, it sends the mobile's location information to the home system, as indicated at block 58. With the transmission of the mobile's location to the home system, the visited system completes its task in the process of maintaining accurate location information for newly registered visiting mobile phones. The remainder of the process resides within the home system and is more fully explained later in the description of FIG. 5.

Still referring to FIG. 4, if the access received by the visited system was not a registration from a new visiting mobile phone at block 52, the process continues to block 60 wherein the visited system determines if the signal received was an access from a previously registered visiting mobile phone. If the signal is determined to constitute an access by a previously registered visitor, the visited system processes the access as required but, at block 62, the system does not inform the visiting mobile's home system of the access. The mobile phone's home system is not informed of the access because the home system previously received location data at block 58; any further notification would be redundant. Once the access is processed by the visited system, the process of the present invention is completed at end block 18.

If, at block 60, the visited system determines that the signal received is not an access from a previously registered visiting mobile phone, the visited system will proceed to block 64 and determine if the signal was a call access from a non-registered visiting mobile phone. If the visited system determines that the signal was from a new visiting mobile phone and the signal was a call access, the system allocates a record of the call and of the new visiting mobile phone at block 66. After allocating a record, the visited system, at block 68, marks "REGISTRATION NOT RECEIVED" within its data files. Thus, the visited system stores within its files the fact that the new visiting mobile phone has only initiated a call access within the visited system but has not actually registered within the system. At block 70, the visited system transmits an order to the visiting mobile's home system to store a temporary location. The temporary location stored within the home system provides the mobile phone's home system with a location so that the system can direct terminating calls to the mobile phone while the mobile operates within a system it has failed to register within. Since the mobile has not registered in the visited system, neither the mobile's home system nor the previously visited system, know where the mobile presently resides. Consequently, calls could not be terminated to the mobile. The present invention, however, by requiring the new visited system to order the home system to store a temporary location for the mobile upon call access allows the mobile to be paged within the new visited system. The temporary location is stored within the home system for the duration of the call, as is shown further in FIG. 5.

Returning to block 64, if the visited system determines that the signal it received is not a call access from a new visitor, it makes one last check to determine whether the signal was a call release from a non-registered visiting mobile phone at block 72. If a determination is made that the signal comprises a call release from a non-registered visiting mobile phone, the visited system continues to block 74 wherein it sends an order to the visiting mobile's home system to delete the previously stored temporary location ordered at block 70.

Thus, upon call release, the visited system informs the home system of the release so that the home system can erase the temporary location. And finally, at block 76, the temporary location data is deleted from within the visited system; whereupon the process terminates at end block 18.

If at block 72, the home system determines that the signal was not a call release from a non-registered visitor, the signal falls outside of the parameters of the present invention and the process returns to block 50 and a signal is awaited from a visiting mobile.

It should be noted that a temporary location could be stored with the home system, using the process described immediately above, upon call initiation. This would not, however, provide protection against multiple call accesses. A better solution, however, is to wait for a successful connection of the mobile subscriber to a voice channel or to a digital traffic channel. While the initial call access might be detected by more than one radio base station connection to more than one system, the voice channel connection criteria greatly diminishes the likelihood of a false call detection and thus increases the probability that the temporary location will permit routing of terminating calls to the mobile phone's actual physical location.

Referring now to FIG. 5, there is shown the process undertaken by a mobile's home system when the home system receives location data pertaining to one of its mobile subscribers. Beginning at block 80, the home system receives data concerning a mobile phone's location. At block 82, the home system ascertains whether the information received was registration location information. If the information is registration location information transmitted pursuant to block 58 of FIG. 4, the home system transmits a signal to the system last visited by the mobile. The signal transmitted at block 84 informs the last visited system that the mobile has vacated that visited system and proceeded on to another system. This information allows the last visited system to clear its records of the mobile. Next, at block 86, the mobile's home system updates its own location data to indicate that the mobile subscriber is in a new visited system. This step is necessary so that the home system may page the mobile when calls are received and directed to that mobile. Once the home system updates its own data regarding the mobile subscriber, there remains nothing further to do and the process is terminated at end block 18.

Returning to block 82 of FIG. 5, if the information received by the home system is not registration location information pertaining to one of its mobile subscribers, the process proceeds to block 88 where it is determined if the data received at block 80 was an order to store a temporary location for one of its subscribers. As will be recalled from the description of FIG. 4, an order to store a temporary location is received when the mobile subscriber initiates a call from within a visited system but does not register within that system. The visited system then transmits a signal to the mobile's home system, which signal corresponds to an order requiring the home system to store a temporary location for the mobile subscriber. The analysis performed within block 88 determines whether the signal received is such a temporary location order from a visited system. If the home system concludes that it has received an order to store a temporary location, the home system will not change the existing registration location data for that particular mobile subscriber, as illustrated by block 90.

The home system retains the existing location data because the temporary location information is valid only for the duration of the subscriber's call. Once the subscriber terminates its call, the temporary location data is deleted. Upon completion of the "temporary location" call, the mobile phone rescans control channels. After rescanning the control channels the mobile may learn that it is located in a system to which it has not registered and then the registration process of FIG. 4 will proceed.

Still referring to FIG. 5, after block 90, the home system stores the temporary location of its mobile subscriber; this occurs at block 92. The temporary location data enables the home system to forward calls received for the mobile, while the mobile is not within the home system. If the mobile subscriber has been provided with services such as call waiting or transfer upon busy, these services can be implemented in conjunction with the temporary location procedure. Since the temporary location data remains active only for the duration of the mobile's call, if the services described above are not provided to the mobile, the calling party hears a busy tone indicating that the mobile subscriber is presently occupied with another call. Thus, once the home system stores the temporary location for its mobile subscriber, it will have completed its tasks, at least until the mobile completes its call, and thus, proceed to the end block 18.

Still referring to FIG. 5, and returning to block 88, if the home system concludes that the signal received at block 80 is not an order to store a temporary location, it next considers whether the signal comprises an order to delete a temporary location at block 94. If the home system determines that the signal is an order to delete a temporary location, the process advances to block 96 where the temporary location is deleted. This completes the process and the home system finishes at end block 18. If the home system, at block 94 concludes that the signal was not an order to delete a temporary location, the home system returns to block 80 to await receipt of another signal.

Referring now to FIG. 6, there is shown the steps taken by a mobile phone's home system, pursuant to the principles of the present invention, when a call is received for the subscriber while the subscriber has a temporary location assigned to it. At block 100, the mobile's home system receives data indicative of a call for the mobile. At block 102 the home system determines whether the call is to be routed to one of its subscribers. If the call is to be routed, the home system proceeds to block 104 where it ascertains whether or not a temporary location exists for the mobile subscriber to which the call is directed. If a temporary location does exist for the mobile subscriber, at block 106, the home system routes the call to the visited system indicated by the temporary location. If the mobile subscriber utilizes services such as call waiting or transfer upon busy, the visited system acts as appropriate, if the mobile does not avail itself to such services, a busy signal will be generated to the calling party. It should be stressed, that while the calling party may not be able to set up a voice channel with the mobile subscriber, by way of the temporary location, the home system is able to accurately locate the mobile subscriber so that the calling party can at least learn that the mobile subscriber is currently occupied with a different call.

Returning to block 104, if no temporary location exists for the mobile subscriber to which the call is to be routed, then the home system locks to block 108 and routes the call to the location indicated within the home system's registration location data storage. This situation arises when the mobile subscriber's location data was generated through the process described in FIG. 4, i.e., registration access transmissions. Once the call is routed to the mobile subscriber the process is completed, as indicated by end block 18.

Thus, there has been described and illustrated herein, a method and apparatus for using temporary location for call routing in mobile telephone systems. However, those skilled in the art will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation on the scope of the invention.

What is claimed is:

1. A method for providing continuous location data for a mobile radio telephone as said mobile phone enters visited cellular networks, said method comprising the steps of:
   receiving an access signal transmitted by said mobile phone;
   determining if said access signal is a registration access or a call access;
   determining if said access signal is a call release signal from said mobile phone;
   storing registration access information from said mobile phone;
   saving call access information from said mobile phone;
   communicating registration access information to said mobile phone's home network; and
   ordering said home network to store a temporary location indication for said mobile phone if said access signal is a call access.

2. A method for providing continuous location data for a mobile radio telephone as said mobile phone enters visited cellular networks, said method comprising the steps of:
   receiving an access signal transmitted by said mobile phone;
   determining if said access signal is a registration access or a call access;
   determining if said access signal is a call release signal from said mobile phone;
   transmitting an order from said visited cellular system to said mobile phone's home system to delete said stored temporary location for said mobile phone if said access signal transmitted by said mobile phone is a call release;
   storing registration access information from said mobile phone;
   saving call access information from said mobile phone;
   communicating registration access information to said mobile phone's home network; and
   ordering said home network to store a temporary location indication for said mobile phone if said access signal is a call access.

3. A method for monitoring the location of a mobile radio telephone while said mobile phone travels among visited cellular networks, said method comprising the steps of:
   storing the location of said mobile phone within said mobile phone's home cellular network;
   updating the location of said mobile phone within said mobile phone's home cellular network only upon said mobile phone's registration access within a visited cellular network;
   indicating a temporary location for said mobile phone upon said mobile phone's initiation of a call from a visited cellular system with which said mobile phone has not registered; and
   deleting said indication of said temporary location when said mobile phone ends said call from said visited cellular system with which said mobile phone has not registered.

4. The method of claim 3 wherein said step of storing the location of said mobile phone comprises the steps of:
   receiving a registration access from said mobile phone within said visited cellular network when said mobile phone enters said visited cellular network;
   allocating a record to said mobile phone within said visited cellular network;
   marking that a registration access was received from said mobile phone within said visited cellular network;
   sending location information from said mobile phone within said visited cellular network to said mobile phone's home cellular network;
   cancelling said mobile phone's location information within said home cellular network at a previously registered visited cellular network; and
   updating location data for said mobile phone within said home cellular network.

5. The method of claim 3 wherein said indication of a temporary location for said mobile phone occurs upon said mobile phone's successful connection to a voice channel.

6. The method of claim 3 wherein said indication of a temporary location for said mobile phone occurs upon said mobile phone's successful connection to a digital traffic channel.

7. The method of claim 3 wherein said step of indicating a temporary location for said mobile phone upon said mobile phone's initiation of a call further comprises the steps of:
   receiving a call access from a mobile phone within said visited cellular network, said mobile phone having failed to register within said visited cellular network;
   allocating a record to said mobile phone within said visited cellular network;
   marking said record to indicate that a registration was not received from said mobile phone within said visited cellular network;
   ordering said mobile phone's home cellular system to store a temporary location indication for said mobile phone, said temporary location indication corresponding to said visited cellular network;
   receiving an order to store a temporary location indication for said mobile phone within said home cellular network;
   preserving the existing location data for said mobile phone within said home cellular network; and
   storing said temporary location indication for said mobile phone within said home cellular network.

8. The method of claim 3 wherein said step of deleting said indication of said temporary location when said mobile ends said call further comprises the steps of:

receiving a call release signal from said mobile phone within said visited cellular network;

ordering said home cellular system of said mobile phone to delete said indicated temporary location within said visited cellular network; p1 receiving an order to delete said mobile phone's temporary location indication within said home cellular network; and deleting said temporary location indication within said home cellular network.

9. The method of claim 3 further comprising the steps of: p1 receiving within said home cellular network a call to be terminated with said mobile phone;

determining if a temporary location indication exists for said mobile phone within said home cellular network;

routing said received call to said temporary location when said temporary location indication exists within said home cellular network; and directing said received call to said mobile phone's registered location when said temporary location indication does not exist within said home cellular network.

10. A mobile communications system for accurately storing the location of a mobile radio telephone, said system comprising:

at least one mobile radio telephone;

a home system for said mobile phone, said home system storing location data pertaining to said mobile phone;

at least one visited system in which said mobile phone can be located including means for detecting signals transmitted by said at least one mobile radio telephone and for distinguishing between registration access signals and call access signals within said detected signals;

means responsive to the detection of either a registration access signal or a call access signal from a mobile radio telephone which is not registered with said visited system for allocating a record within said visited system to said mobile;

means responsive to the detection of signals from said mobile for marking said allocated record as to whether or not said detected signals include a registration access signal; and means for transmitting information from said visited system to said home system of said mobile radio telephone indicative of the type of access signal received from said mobile radio telephone as to which a record has been allocated.

11. The mobile communications system of claim 10 wherein said means for transmitting information to said home system is responsive to the receipt of a registration access signal from said mobile and includes means for sending location information to said home system for storage therein as an indication that said radio telephone has registered within said visited system.

12. The mobile communications system of claim 10 wherein said means for transmitting information to said home system is responsive to the receipt of a call access signal from said mobile and includes means for ordering said home system to store a temporary location indication for said mobile radio telephone as an indication that said mobile radio telephone is present within said visited system but has not registered within said visited system.

13. The mobile communications system of claim 10 wherein said home system for said mobile radio telephone comprises:

means for receiving from a visited system information indicative of the type of access signal received from said mobile radio telephone;

means for distinguishing between the receipt of information indicative of a registration access and a call access from said mobile radio telephone;

means responsive to the receipt of information indicative of a registration access for transmitting a cancellation order to a visited system in which said mobile radio telephone was last registered;

means for responsive to the receipt of information indicative of a registration access for updating the stored location information of said mobile radio telephone;

means responsive to the receipt of information indicative of a call access for storing a temporary location indication for said radio telephone without deleting said registration location information therefor;

means responsive to the receipt of a call in said home system for said mobile telephone for routing calls to said mobile radio telephone's registration location when no temporary location indication information exists; and means responsive to the receipt of a call in said home system for said mobile telephone for routing calls to said mobile radio telephone's temporary location when said temporary location information does exist.

14. A system for monitoring the location of a mobile radio telephone while said mobile phone travels among visited cellular networks, said system comprising:

means for storing the location of said mobile phone within said mobile phone's home cellular network;

means for updating the location of said mobile phone within said mobile phone's home cellular network only upon said mobile phone's registration access within a visited cellular network;

means for indicating a temporary location for said mobile phone upon said mobile phone's initiation of a call from a visited cellular system within which said mobile phone has not registered; and means for deleting said indication of said temporary location when said mobile phone ends said call from said visited cellular system.

15. The system of claim 14 wherein said means for storing the location of said mobile phone comprises the steps of:

means for receiving a registration access within said visited cellular network from said mobile phone when said mobile phone enters said visited cellular network;

said visited cellular network having means for allocating a record to said mobile phone;

means for marking that a registration access was received by said visited cellular network from said mobile phone;

means for sending location information pertaining to said mobile phone from said visited cellular network to said mobile phone's home cellular network;

means for cancelling said mobile phone's location information at a previously registered visited cellular network by said mobile phone's home cellular network; and said home cellular network having means for updating locating data pertaining to said mobile phone.

16. The system of claim 14 wherein said means for indicating a temporary location for said mobile phone includes means responsive to the successful connection of said mobile phone to a voice channel.

17. The system of claim 14 wherein said means for indicating a temporary location for said mobile phone includes means responsive to the successful connection of said mobile phone to a digital traffic channel.

18. The system of claim 14 wherein said means for indicating a temporary location for said mobile phone upon said mobile phone's initiation of a call further comprises:
 means for receiving a call access by said visited cellular system from a mobile phone which has failed to register within said visited cellular network;
 means within said visited cellular network for allocating a record to said mobile phone;
 means within said visited cellular network for marking said record that a registration was not received from said mobile phone;
 means within said visited cellular network for ordering said mobile phone's home cellular system to store a temporary location indication for said mobile phone, said temporary location corresponding to said visited cellular network;
 means for receiving an order to store a temporary location indication for said mobile phone within said home cellular network;
 means for preserving the existing location data for said mobile phone within said home cellular network; and
 means for storing said temporary location indication for said mobile phone within said home cellular network;

19. The system of claim 14 which further comprises:
 means for receiving a call release signal by said visited cellular network from said mobile phone;
 means within said visited cellular network and responsive to the receipt of a call release signal for ordering said home cellular system of said mobile phone to delete said indicated temporary location;
 means within said home cellular network for receiving an order to delete said mobile phone's temporary location indication; and
 means for deleting said temporary location indication by said home cellular network.

20. The system of claim 14 further comprising:
 means for receiving a call to be terminated with said mobile phone by said home cellular network;
 means within said home cellular network for determining if a temporary location indication exists for said mobile phone;
 means for routing said received call by said home cellular network to said temporary location when said temporary location indication exists; and
 means for directing said received call to said mobile phone's registered location by said home cellular network when said temporary location indication does not exist.

* * * * *

UNITED STATES PATENT AND TRADEMARK OFFICE
CERTIFICATE OF CORRECTION

PATENT NO. : 5,307,400
DATED : April 26, 1994
INVENTOR(S) : Francois Sawyer et al.

It is certified that error appears in the above-indentified patent and that said Letters Patent is hereby corrected as shown below:

Column 6, line 36       Delete "whioh"
                            Insert --which--.

Column 7, line 31       Delete "whioh"
                            Insert --which--.

Column 13, line 1       Delete "locks"
                            Insert --looks--.

Signed and Sealed this

Fifth Day of August, 1997

Attest:

BRUCE LEHMAN

*Attesting Officer*     Commissioner of Patents and Trademarks